(12) United States Patent
Kisin et al.

(10) Patent No.: US 10,511,653 B2
(45) Date of Patent: Dec. 17, 2019

(54) DISCUSSION-BASED DOCUMENT COLLABORATION

(71) Applicant: PARLEY PRO INC., Los Altos, CA (US)

(72) Inventors: Roman Kisin, San Jose, CA (US); Lilian Caldeira, Emerald Hills, CA (US)

(73) Assignees: Roman Kisin, San Jose, CA (US); Lilian Caldeira, Emerald Hills, CA (US)

( * ) Notice: Subject to any disclaimer, the term of this patent is extended or adjusted under 35 U.S.C. 154(b) by 497 days.

(21) Appl. No.: 15/291,605

(22) Filed: Oct. 12, 2016

(65) Prior Publication Data

US 2017/0103066 A1 Apr. 13, 2017

Related U.S. Application Data

(60) Provisional application No. 62/239,977, filed on Oct. 12, 2015.

(51) Int. Cl.
*H04L 29/08* (2006.01)
*G06F 17/24* (2006.01)
(Continued)

(52) U.S. Cl.
CPC ............ *H04L 67/06* (2013.01); *G06F 17/212* (2013.01); *G06F 17/2288* (2013.01);
(Continued)

(58) Field of Classification Search
CPC ..... H04L 67/06; H04L 65/403; G06F 17/212; G06F 17/2288; G06F 17/24; G06F 21/604; G06F 2221/2147; G06Q 10/103
See application file for complete search history.

(56) References Cited

U.S. PATENT DOCUMENTS

| 8,291,019 B1 * | 10/2012 | Rochelle | G06Q 10/107 709/205 |
| 2002/0111968 A1 * | 8/2002 | Ching | G06F 16/748 715/229 |

(Continued)

OTHER PUBLICATIONS

Adams et al., Pro SharePoint Solution Development: Combining .NET, SharePoint, and Office 2007, May 2007, ISBN: 9781590598085. (Year: 2007).*

*Primary Examiner* — Jay A Morrison
(74) *Attorney, Agent, or Firm* — Perkins Coie LLP

(57) ABSTRACT

A document collaboration apparatus and method allows users to create, edit, manage, collaborate, and communicate over sets of documents, such as word processor documents, spreadsheets, or other types of documents. A set of documents is obtained and split into a series of fragments that are stored in a secure way in a combination of a relational database and an unstructured content store. Access to individual fragments within the series of fragments is granted to users, and proposed changes and comments are obtained in a form of structured discussions that are associated with the fragments from the document set. A controlled workflow-driven mechanism for discussion-centered collaboration is provided. Any changes to the documents from the document set are restricted to the changes that are approved in associated discussions only, providing controlled collaboration between multiple parties or groups of users, such as in multi-party contract negotiations and large scale collaborations.

33 Claims, 27 Drawing Sheets

(51) Int. Cl.
*G06F 17/22* (2006.01)
*H04L 29/06* (2006.01)
*G06Q 10/10* (2012.01)
*G06F 17/21* (2006.01)
*G06F 21/60* (2013.01)

(52) U.S. Cl.
CPC ............ *G06F 17/24* (2013.01); *G06F 21/604* (2013.01); *G06Q 10/103* (2013.01); *H04L 65/403* (2013.01); *G06F 2221/2147* (2013.01)

(56) References Cited

U.S. PATENT DOCUMENTS

| | | | | |
|---|---|---|---|---|
| 2013/0035929 | A1* | 2/2013 | Okamoto | G06Q 10/10 704/9 |
| 2015/0381590 | A1* | 12/2015 | Bosko | H04L 63/0428 713/171 |
| 2016/0378725 | A1* | 12/2016 | Marchsreiter | G06F 17/2229 715/255 |

* cited by examiner 1.3 *Preliminary Works.* Provider retains limited rights in and to all Preliminary Works. Client shall return all Preliminary Works to Provider within 30 days of completion of the Services and all rights in and to any Preliminary Works shall remain the exclusive property of Provider.    301

According to the company policy the right to the preliminary work has to be limited    302

Preliminary work rights    303

PRIORITY ● — 304         Cancel ✕         Start Discussion

FIGURE 5 damages, liabilities, costs, losses or expenses arising out of any claim, demand, or action by a third party arising out of Client's failure to obtain copyright, trademark, publicity, privacy, defamation or other releases or permission ct to materials included in the Final Art.

1.3 *Preliminary Works.* Provider retains limited rights in and to all Preliminary Works. Client shall return all Preliminary Works to Provider within 45 days of completion of the Services and all rights in and to any Preliminary Works shall remain the exclusive property of Provider.

601
602

1.4 *Original Artwork.* Provider retains all right and title in and to any original artwork comprising Final Art, including all rights to display or sell such artwork. Client shall return all original artwork to Provider within 30 days of completion of the Services.

1.5 *Trademarks.* Upon completion of the Services and expressly conditioned upon full payment of all fees, costs and out-of-pocket expenses due, Provider assigns to Client all ownership rights, including any copyrights, in and to any artworks or designs comprising the works created

Discussion Posts 801  802
JOAN SMITH, TODAY 1.3 Preliminary Works. Provider retains all rights in and to all Preliminary Works. Client shall  803
return all Preliminary Works to Provider within 45 days of completion of the Services and all
rights in and to any Preliminary Works shall remain the exclusive property of Provider.

increase return time  804

FIGURE 19

DISCUSSION-BASED DOCUMENT COLLABORATION

CROSS REFERENCE TO RELATED APPLICATIONS

This application claims priority to U.S. provisional patent application Ser. No. 62/239,977, filed Oct. 12, 2015, which application is incorporated herein in its entirety by this reference thereto.

FIELD

The invention relates to electronic document systems. More particularly, the invention relates to secure creation and collaboration over one or more sets of documents in multi-user and multi-party environments.

BACKGROUND

A variety of the traditional desktop-based word processing applications, including Microsoft Word, and cloud-based online word processing tools, such as Google Docs, Office 365, etc. are fairly efficient when used by individuals or very small groups of collaborators for performing typical word processing tasks, such as creating a document, making minor changes, formatting, etc. However, as the number of collaborators and/or volume of back and forth changes increases, existing systems exhibit several common issues. For example, track changes and comparison tools which generate redline markup are hard to follow, especially after several iterations of changes; management of multiple versions is difficult and error-prone; comments and proposed changes are not grouped and not prioritized; and there is a lack of visibility into remaining and unresolved issues.

SUMMARY

Embodiments of the invention provide a document collaboration apparatus and method that allow users to create, edit, manage, collaborate, and communicate over sets of documents, such as word processor documents, spreadsheets, or other types of documents. In embodiments of the invention, a set of documents is obtained and split into a series of fragments that are stored in a secure way in a combination of a relational database and an unstructured content store. Access to individual fragments within the series of fragments is granted to users, and proposed changes and comments are obtained in a form of structured discussions that are associated with the fragments from the document set. Accordingly, a controlled workflow-driven mechanism for discussion-centered collaboration is provided. Any changes to the documents from the document set are restricted to the changes that are approved in associated discussions only. Embodiments of the invention thus enable controlled collaboration between multiple parties or groups of users, such as in multi-party contract negotiations and large scale collaborations.

DRAWINGS

FIG. 5 shows an example of the initial user input according to the invention;

FIG. 8 shows accepted and open discussions and their association with portions of documents according to the invention;

FIG. 9 shows an example of a previewed document according to the invention;

Figure 17:
Figure 18:
Figure 20:
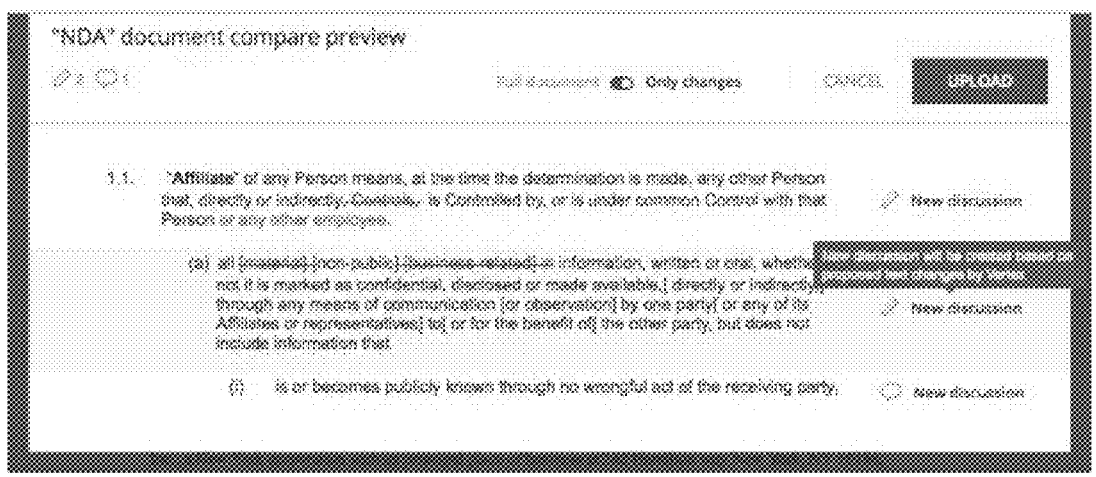

FIG. 17 displays a list of discussions in an order relevant to a user;

FIG. 18 shows a log report that includes preview and compare functionality according to the invention;

Figure 19:
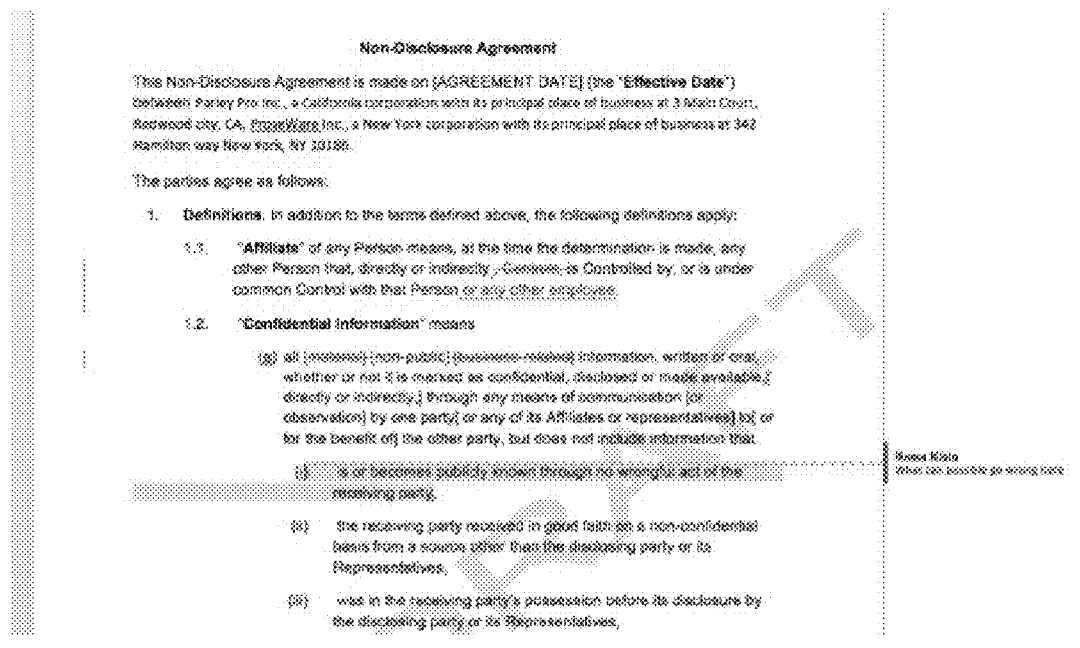

FIG. 19-26 show hybrid model functionality according to the invention; and

Figure 27:
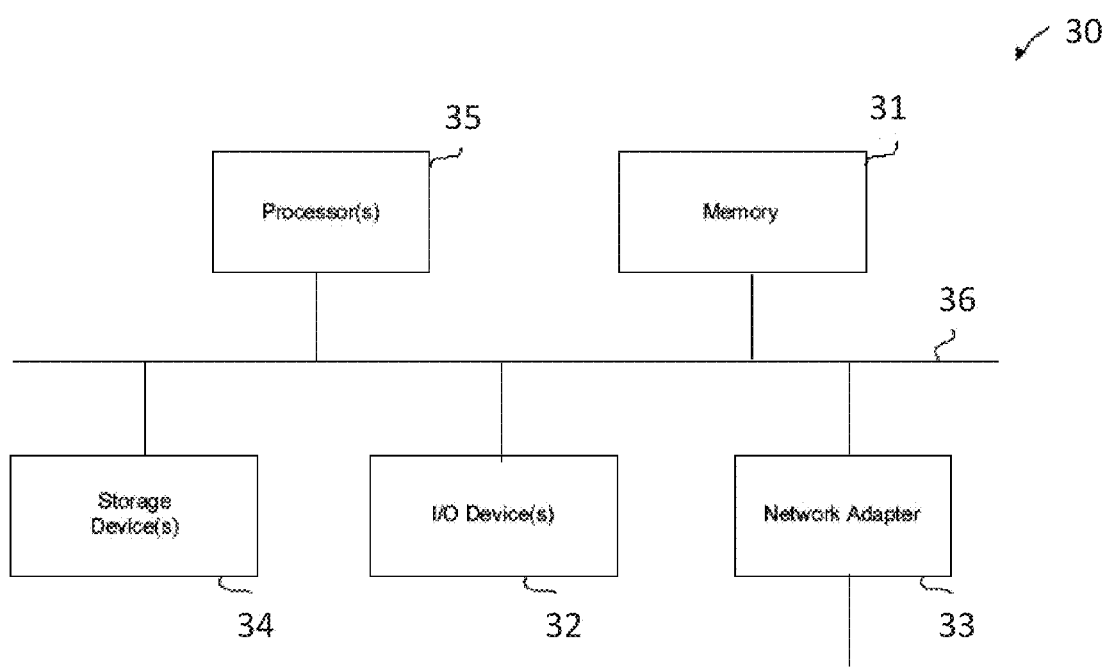

FIG. 27 is a block schematic diagram showing a machine in the example form of a computer system within which a set of instructions for causing the machine to perform one or more of the methodologies discussed herein may be executed.

DESCRIPTION

Figure 1:
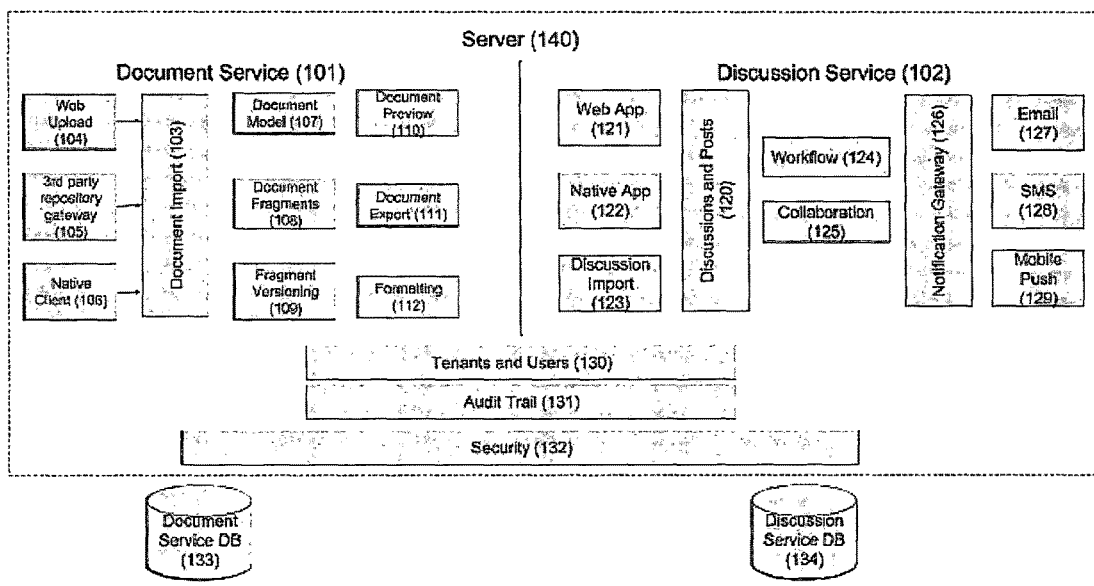
FIG. 1 is a block diagram of a discussion-based document collaboration apparatus according to the invention.

FIG. 1 is a block diagram of a discussion-based document collaboration system according to the invention.

In the embodiment shown in FIG. 1, the system 100 includes a discussion service module 102 and a document service module 101.

The document service module 102 can be deployed on at least one computing device, such as physical or a virtual server 140.

The document service 102 includes a document import module 103 that is used to obtain documents through a variety of channels, such as a Web upload 104, to allow users upload the documents from the file system mounted on a desktop in a secure way. The documents can also be uploaded from a third party document and file repository, such as box.com, dropbox.com, MS OneDrive, etc. by using the third party repository gateway 105. The documents can also be uploaded from a mobile device using a native application by using native client library 106.

In embodiments of the invention, the document model 107 is an internal representation of the document, based on the document fragments 108 generated during the document import. A fragment versioning module 109 manages evolution of the document fragments throughout the lifecycle of the documents.

A document preview module 110 interfaces with the discussion service 102 and generates a preview of the document by assembling versions of the fragments from discussions and from the original documents.

A document export module 111 generates documents in one or more word processing formats, such as MS Word, Open Office, or Portable Document Format (PDF) by assembling versions of the fragments from accepted discussions and fragments from the original document.

A formatting module 112 provides basic document formatting capabilities to authorized users to prepare the document for export. The formatting module generates a detailed audit trail for any formatting changes.

A discussions service 102 can be deployed on at least one computing device, such as physical or a virtual server 140. The discussions service 102 includes a discussion and posts module 120 that manages the lifecycle of the discussions and posts within discussions, and that also includes basic operations such as creating a discussion, creating a post, closing a discussion, etc. Discussions and posts can be created by using the system's Web application 121, a native mobile application 122, or by importing discussions/posts using a discussion import module 123 using supported formats, such as MS Word (track changes), email, SMS, etc.

A workflow module 124 controls the lifecycle of the fundamental business objects, such as discussions, documents, sets of documents, etc., and the workflow module orchestrates user notifications and state transitions.

A collaboration module 125 orchestrates interactions between collaborators, moderators, and other participants over discussions, documents, and sets of documents.

A notification gateway 126 is responsible for delivering notifications to the collaborators. An email module 127 provides email-based notification delivery, and an SMS module 128 delivers SMS-based notifications. Mobile push notifications are delivered using a mobile push module 129.

System tenants and users within a specific discussion are managed by a tenant and user module 130.

An audit trail module 131 is responsible for reporting on the key business events.

Overall security is managed by the security module 132, including management of various forms of authentication and authorization using a role-based model with optional multi-factor authentication, advanced encryption, DDOS protection, and other enterprise level security features.

The data for the document service 133 is stored in a relational database. Some unstructured data can be stored in non-relational store for easy retrieval. The data is stored in encrypted form using tenant specific encryption keys. The data for the discussion service is stored in a relational database 134.

Figure 2:
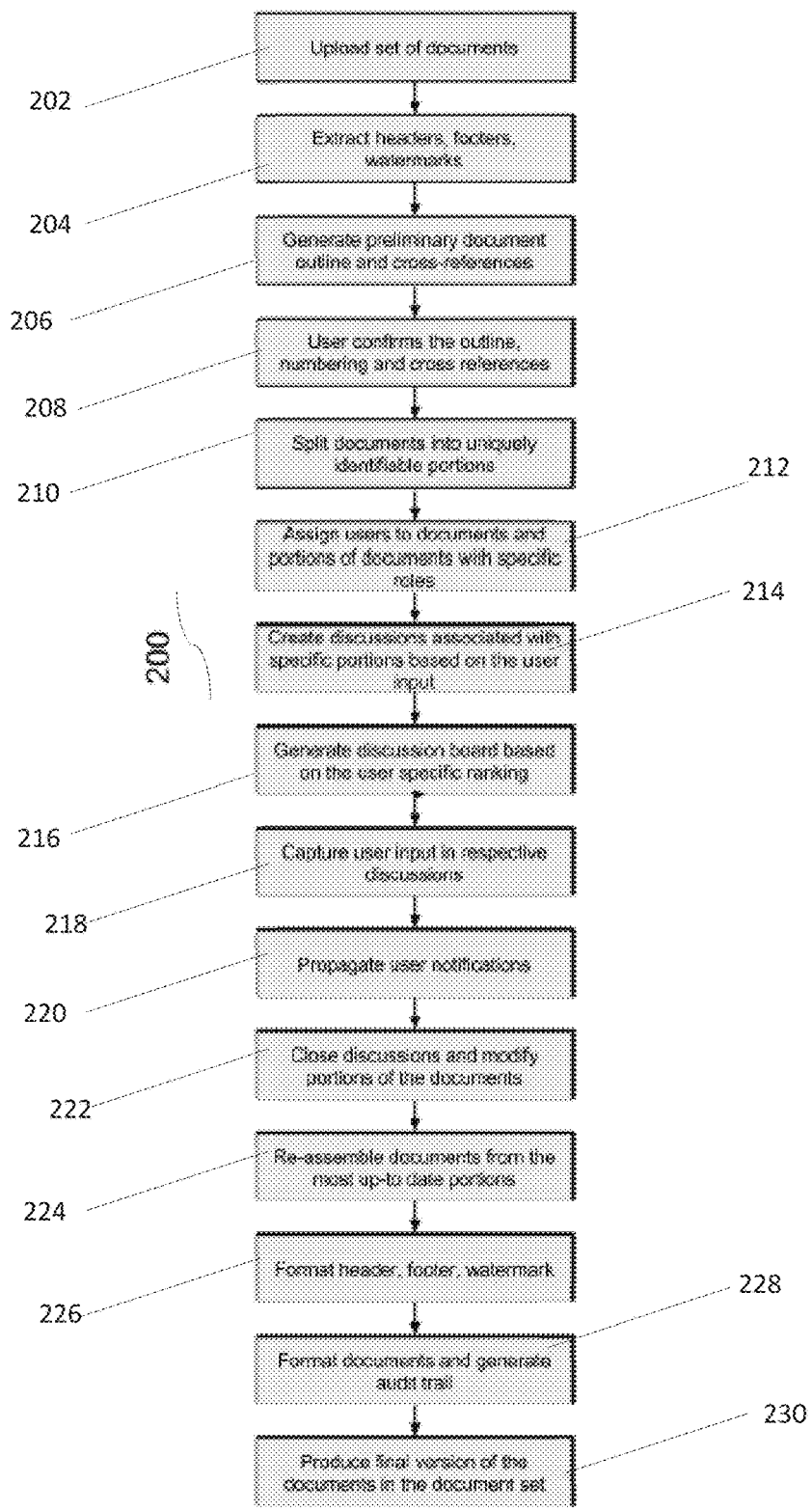
FIG. 2 is a block diagram of a document set collaboration method according to the invention.

FIG. 2 is a block diagram showing an example document set collaboration method. In embodiments of the invention, the method 200 is executed or performed by at least one computing device, such as the server 140 shown in FIG. 1. Further, the method 200 may be implemented in the form of executable instructions stored on at least one non-transitory machine-readable storage medium of the computing device and executed by at least one processor of the computing device. The non-transitory machine-readable storage medium may be any electronic, magnetic, optical, or other physical storage device that stores executable instructions. For example, the medium may be a random access memory (RAM), an electrically-erasable programmable read-only memory (EEPROM), a storage drive, an optical disc, and the like. The medium may be disposed within computing device or it may be a portable, external, or remote storage medium, for example, that allows computing device to download the instructions from the portable/external/remote storage medium.

Alternatively or in addition, the method 200 may be implemented in the form of electronic circuitry, e.g. hardware. In other embodiments of the invention, at least one step of the method 200 may be executed substantially concurrently or in a different order than shown in FIG. 2. In yet other embodiments of the invention, then method 200 may include more or fewer steps than are shown in FIG. 2. In some embodiment of the invention, at least one step of the method 200 may, at certain times, be ongoing and/or may repeat.

Embodiments of the invention obtain a document or a set of documents via direct upload, connection to a third party document repository system, by referencing a document, or from a set of documents that has previously been obtained by the system. The documents can also be obtained from another party involved in the collaboration. In operation, a set of documents is uploaded (202); headers, footers, and watermarks are extracted therefrom (204); and a preliminary document outline and cross references is generated (206). The user confirms the outline, number, and cross references (208).

Upon obtaining the document set, the documents are split into uniquely identifiable portions (210). Embodiments of the invention process the documents by splitting them into fragments, parsing out headers, footers, watermarks, and other types of formatting data and metadata and storing that information for future use. The fragments can be any of paragraphs, sections and sub-sections of the documents, user defined fragments of variable length, etc.

Embodiments of the invention use a document outline and references that are defined in the word processing file before the documents are uploaded into the system, when available. If not available, the system uses a natural language pattern matching algorithm to identify potential section headings and references and present a user with a user interface showing machine identified sections and overall document outline with an option for a user to confirm. For example it would identify as a reference a fragment of the text such as:

". . . According to chapter 1.3 . . . "

due to the presence of the valid and existing chapter number and proximity to the words that typically used in the context of the references.

Embodiments of the invention can be trained to use more or other words by the pattern recognition algorithm to identify potential references. Embodiments of the invention are also capable of recognizing and establishing references across multiple documents in the document set. For example, user may have a document set containing:

"Master Agreement"

and a secondary document such as a:

"Schedule A"

document containing a fragment of text such as:

". . . According to chapter 1.3 of the Master Agreement . . . "

Figure 3:
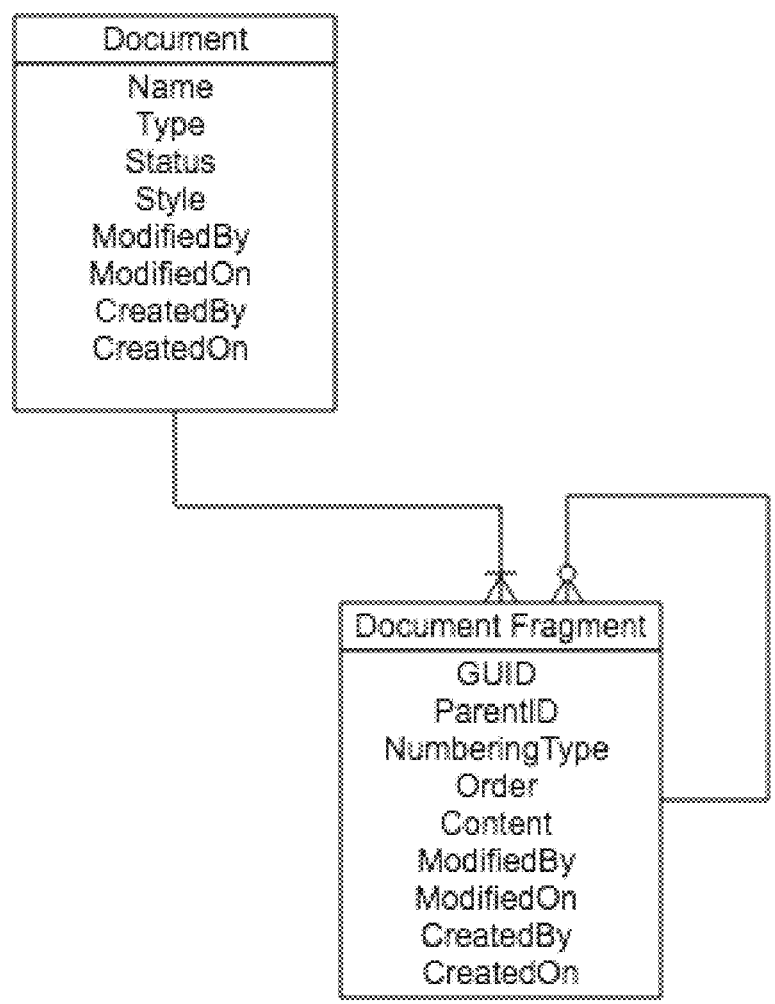
FIG. 3 shows a document model according to the invention.

The algorithm recognizes the reference pattern and generates a view and internal data model that establishes the reference relationships between the fragments of the text across the document set. During the import the system splits document into fragments based on the structure of the document, combined with the natural language processing methods for determining boundaries of fragments, such as paragraphs and sections. Users can manually override the boundaries of the fragments. The document model is depicted in FIG. 3. The content of a fragment can contain a reference to another fragment using a unique GUID.

Figure 4:
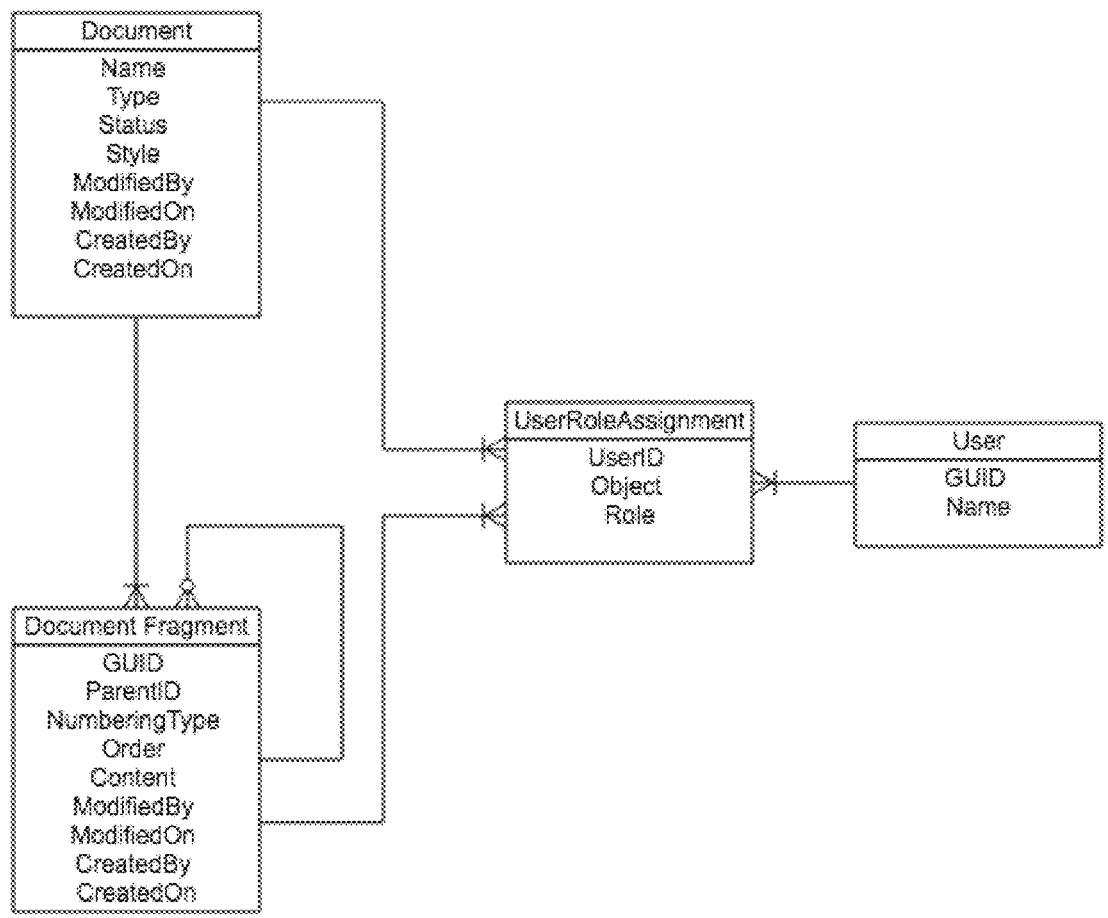
FIG. 4 shows the assignment of users to documents and portions of documents according to the invention.

The access control is maintained at the entire document or a fragment level. Therefore, users can be assigned to documents and portions of documents (see FIG. 4). Additionally the users can be granted specific roles (212). For example, during contract negotiation subject matter experts can be assigned to a specific sections of the contract such as financial, compliance, business clauses.

Discussions associated with specific portions of the documents are created based upon user inputs (214) and a discussion board is generated based upon a user specific ranking (216).

User input is captured in respective discussions (218) and user notifications are propagated accordingly (220). Authorized users are able to grant access to the internal collaborators to the entire documents or a portion of the document from the document set. When a user is granted access to at least one document from a document set, a notification is generated that includes an embedded link to at least one document in the document set. Upon accessing at least one document, collaborators can start a new discussion by providing initial input to a specific fragment of the text. The discussions are then closed and portions of the documents affected by the discussions are modified (222). The documents are reassembled from the most up-to-date portions (224) and the header, footer, and watermark are formatted (226). The documents are then formatted and an audit trail is created (228); and a final version of the documents is produced in the document set (230).

User Inputs

FIG. 5 shows an example of the initial user input, including proposed changes to the current content of the fragment 301, a freeform comment explaining the proposed change 302, the title of the discussion 303, and priority of the discussion 304. Additionally, user inputs can also include tags and other metadata. For example, a discussion can be categorized as related to a specific area of responsibilities, such as legal, business, tax, etc.

Following creation of the discussion, a second input is obtained from any of the users associated with the set of documents. The input is associated with the discussion and comprises at least one of a comment and a proposed portion associated with the at least one portion. Upon obtaining a third input from an authorized user indicating acceptance of the proposed portion, the at least one portion is replaced with the proposed portion in the at least one document.

Inserting a New Portion

Figure 6:
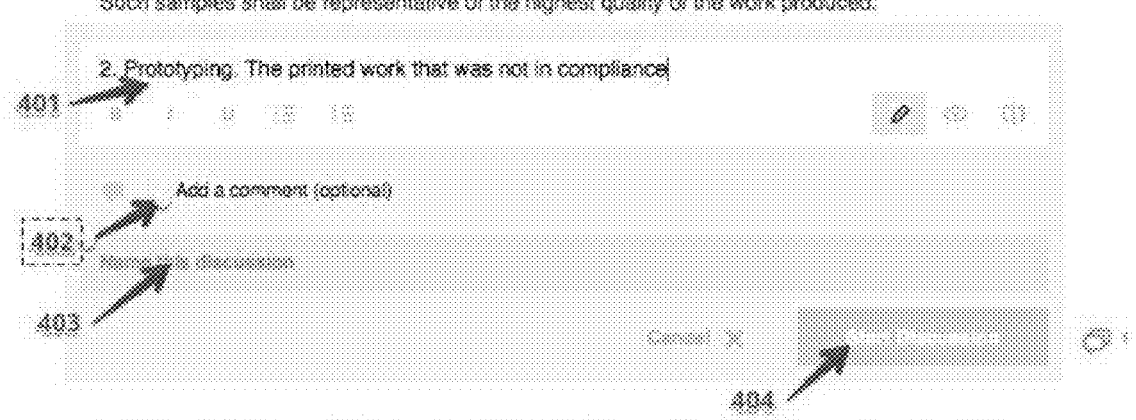
FIG. 6 shows another example of the initial user input according to the invention.

A discussion can also be associated with a specific location in at least one document from the document set. Embodiments of the invention create a new discussion upon receiving the first input associated with a specific location. FIG. 6 shows an example of the initial user input. User input can be associated with a specific location within at least one document from the document set and contains, for example, a proposed fragment 401; a freeform comment explaining the proposed change 402; a title of the discussion 403; a discussion priority (not shown); and a start a new discussion button 404.

Following the creation of the discussion, a second input is obtained from any of the users associated with the set of documents. The input is associated with a specific location and comprises at least one of a comment and a proposed portion associated with the at least one portion. Upon obtaining a third input from an authorized user indicating an acceptance of the proposed portion, at least one portion with the proposed portion is inserted in at least one document.

Deleting a Portion

Figure 7:
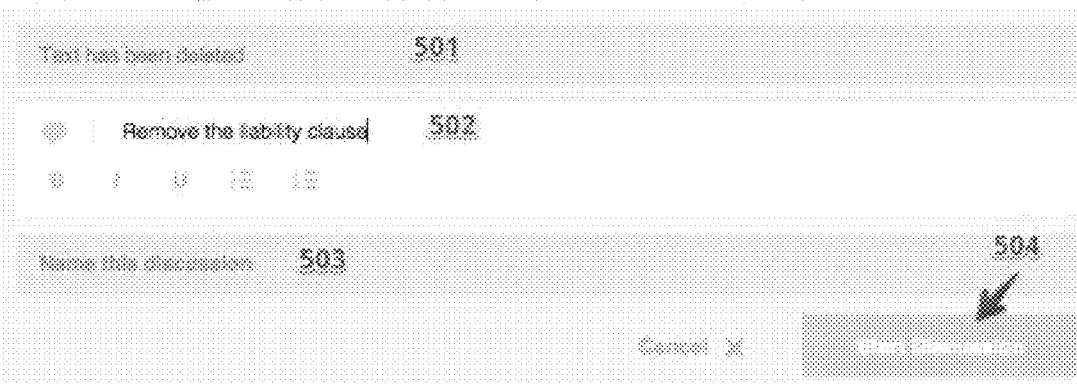
FIG. 7 shows elements that are contained in a fragment of a document from a document set where user inputs associated with a fragment of the document set according to the invention.

Deleting at least one portion of at least one document from the document set is accomplished with a special type of discussions by providing initial user input to a specific fragment of the text. FIG. 7 shows elements that are contained in a fragment of a document from a document set where user inputs associated with a fragment of the document set according to the invention. User input can be associated with a fragment of a document from the document set and can contain any of a system message about document deletion with the ability to see the text being deleted on hover or another trigger 501; a freeform comment explaining the proposed deletion 502; a title of the discussion 503; a priority of the discussion (not shown); and a start a discussion button 504.

Following the creation of the discussion, a second input is obtained from any of the users associated with the set of documents. The input is associated with the discussion and comprises at least one of a comment and a proposed portion associated with the at least one portion. Upon obtaining another input from an authorized user indicating an acceptance of the deletion of at least one portion associated with the discussion, the at least one portion in the at least one document is deleted.

Document View

Embodiments of the invention generate a view that shows accepted and open discussions and their association with the portions of documents. FIG. 8 provides an example of such a view showing a number of open discussions 601 and a number of closed discussions 602.

Embodiments of the invention also generate a view that shows all of the discussions, including open and accepted discussions for a specific portion of a document from the document set. The user can see a complete evolution of the portion of the document across multiple discussions, including information on when and by whom portions of the text have been modified, inserted, or deleted.

Figure 9:
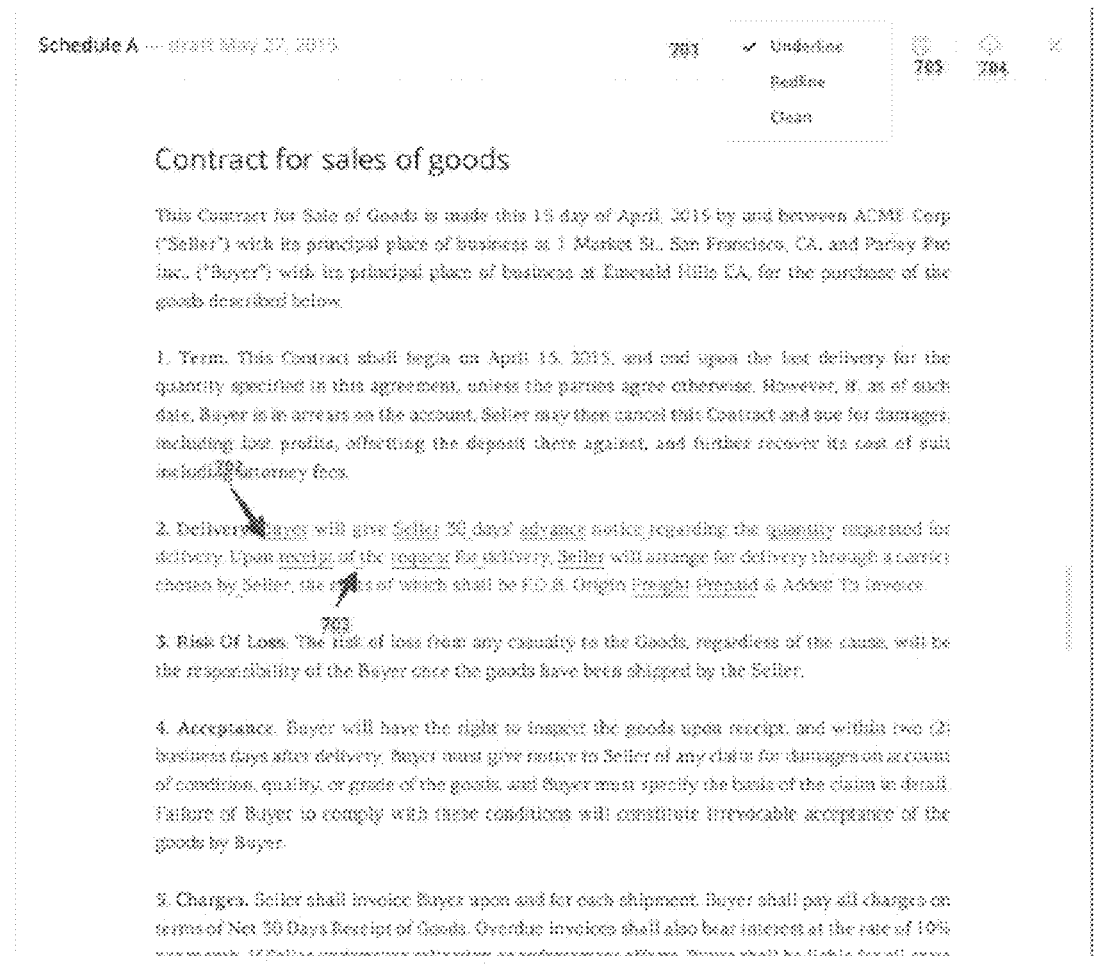

FIG. 9 shows an example of a previewed document. A preview is generated by assembling the content based on the original content of the document augmented with any of the most recent accepted versions of the document fragments; the most recent accepted versions of the document fragment further augmented with a content of a specific post in an active or accepted discussion; and the most recent versions of the document fragments including posts from currently active discussions.

The previews are generated including any of the following markup models 701:
  Redline—changes are indicated by red line/text for removed text and green text for added text;
  Simple markup—displaying locations in the text where fragments were removed with red underline 703 and displaying location of the added and modified text with blue underline 702; and
  Clean—displaying resulting version without additional markup.

The content of the preview can be downloaded 704 or printed 705.

Discussions

Figure 10:
FIG. 10 shows an example of a post containing a proposed text according to the invention.

A discussion is a grouped set of discussion posts related to a specific concept. FIG. 10 shows an example of a post containing a proposed text. Each post has at least one of a proposed version of the text for at least one fragment of the text associated with a discussion 803 and a comment 804.

Additionally posts have the following metadata:
Author 801;
Date created timestamp 802;
Privacy attributes controlling who can see the post including:
  private—visible only to the author,
  internal: visible to the author's team,
  external: visible to other team for example to a counterparty in a contract negotiation scenario; and
Status (draft, released, etc.).
A discussion has the following attributes:
Title—name of the discussion describing the concept discussed in the discussion; and
Priorities—typical examples are high, normal, low, etc.; there might be several priorities associated with a discussion:
  Internal—type of priority applicable to the members of the author's group, and
  External—type of priority applicable to the external groups of users.

Other user defined metadata, for example discussions, can be associated with lines of business, departments; type of clause in a contract, etc.; due date, e.g. target date for closing a discussion; moderator, e.g. a person or a group of people tasked with moderating a discussion including closing and accepting the changes; associated text fragment or fragments; type, e.g. examples in the commercial contracting space are Legal, Business, IT, etc.; and user-defined tags, etc.

Figure 11:
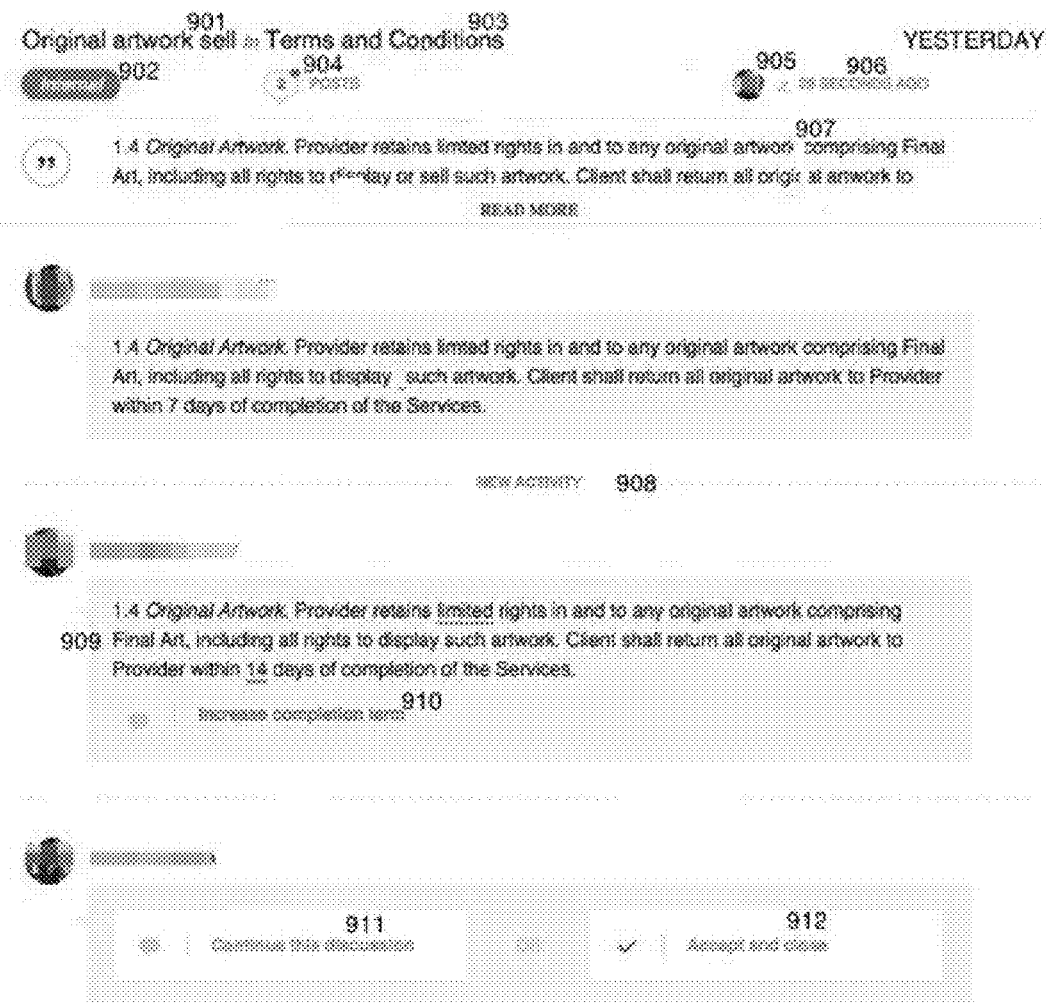
FIG. 11 shows a simple discussion according to the invention.

FIG. 11 shows a simple discussion. A discussion has a name made of the title 901 and the name of the associated document 903. The discussion also has an Internal green label indicating active status and the fact that it has internal posts only.

The discussion shown in FIG. 11 has two posts and, in this embodiment, a dot indicating it is an unread post 904. The author of the last post in the discussion is shown having a user avatar 905. In FIG. 11, the last post contained proposed text, as indicated by the icon, and was made 29 seconds ago 906. An associated text fragment is displayed as a collapsible block 907. A new activity title section 908 precedes the unread posts which are tracked for each collaborator separately, and the view is automatically scrolled down to the new activity section when opened by a collaborator.

Discussion posts can contain proposed text 909 and comments 910. A collaborator can continue a discussion by creating a new post by clicking on the continue this discussion button 911 or by hovering over a specific post and clicking on the pen option.

For a discussion with internal posts, only an authorized user, such as a moderator, has an option of accepting and closing a discussion by clicking on the accept and close button 912. This creates a new post and changes the status of the discussion to closed, thus associating the changes in the document fragment with a given discussion.

Figure 12:
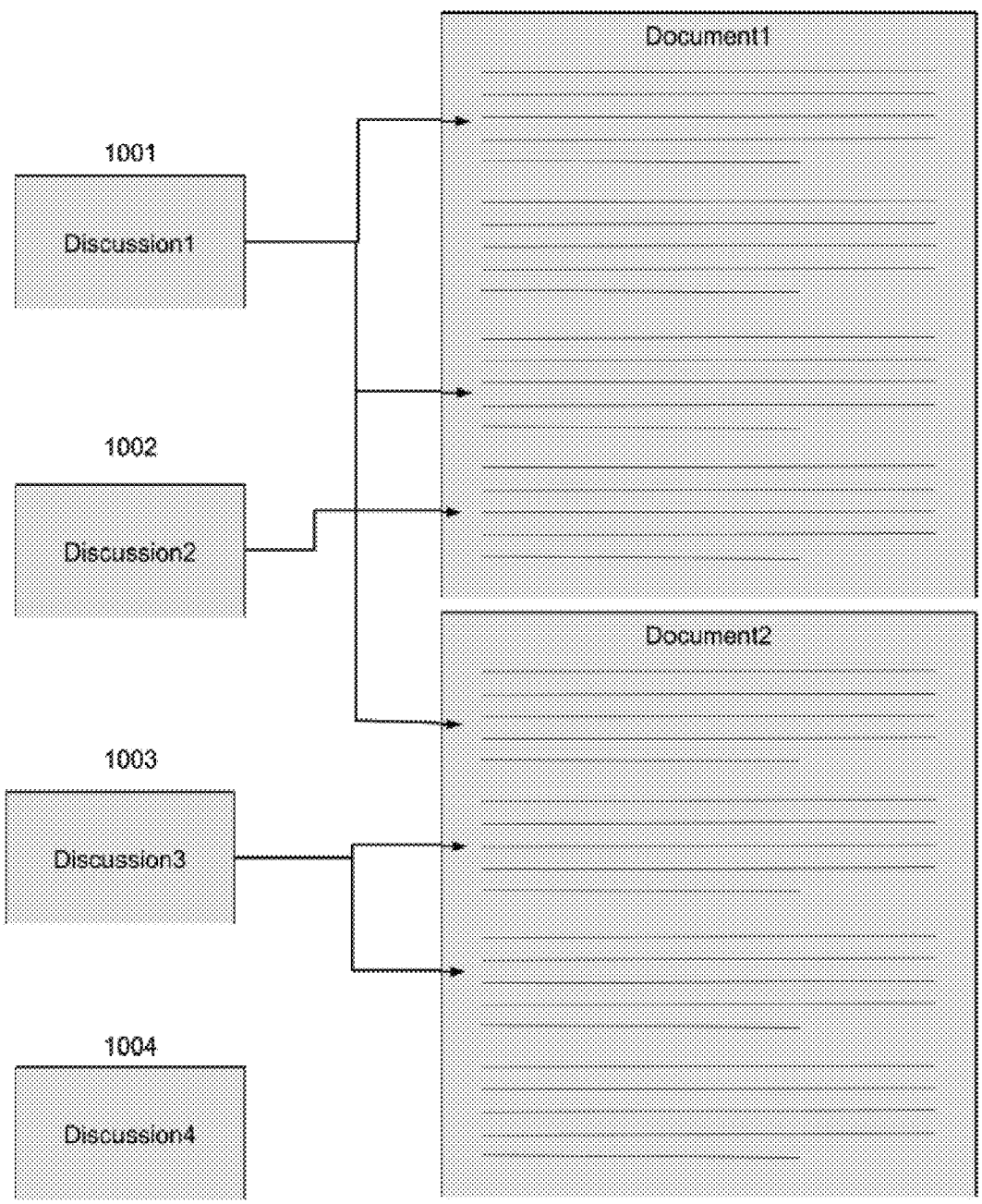
FIG. 12 shows possible associations between discussions and fragments of documents from a document set according to the invention.

FIG. 12 depicts possible associations between discussions and fragments of documents from a document set. In FIG. 12, the choices include the following:
Discussion1 1001, which is associated with multiple fragments from more than one document from a document set;
Discussion2 1002, which is associated with one fragment from a document in a document set;
Discussion3 1003, which is associated with more than one fragment from a document in a document set; and
Discussion4 1004, which is not yet associated with any fragments.

When a discussion is associated with multiple fragments, each post may have proposed text for each of the associated fragments. When the discussion is closed, all of the proposed changes replace corresponding associated fragments in at least one document from a document set. A discussion view is automatically generated that marks all changes in the proposed text made in every post. An example of such a view is shown in FIG. 13.

Figure 13:
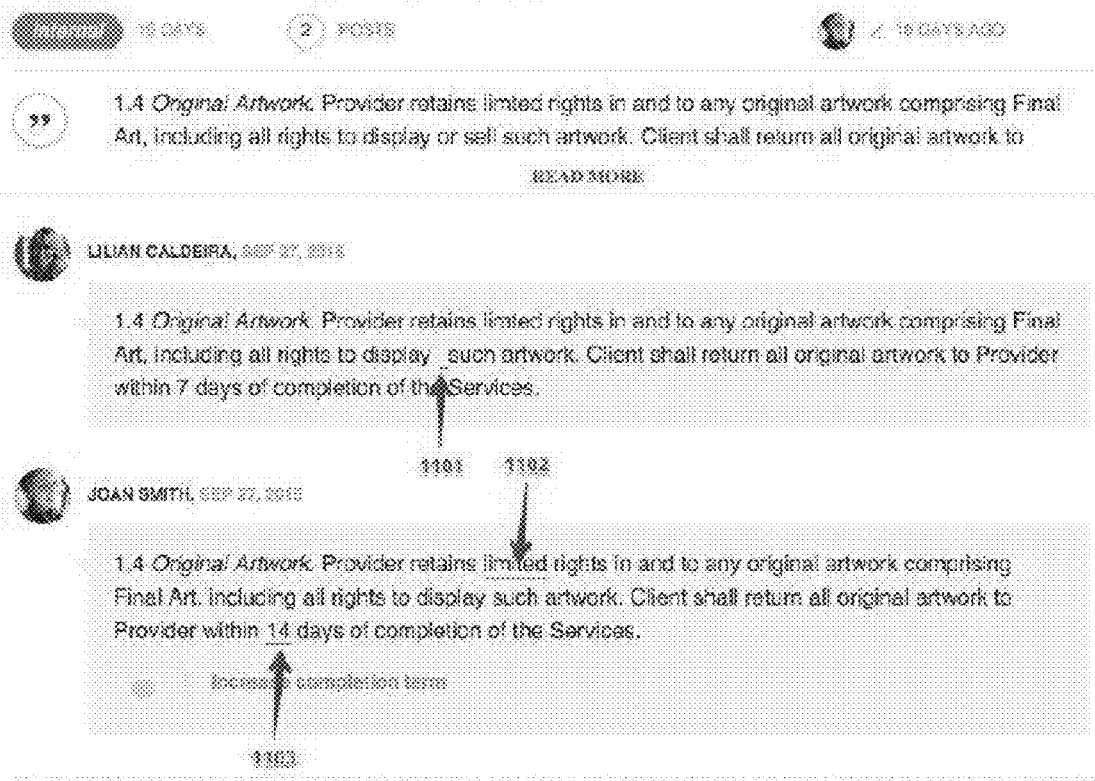
FIG. 13 shows a discussion view that marks all changes in the proposed text made in every post according to the invention.

In FIG. 13, for the first post containing proposed text in a discussion the content of the post is compared with original text from the associated fragment as it existed in the document when the discussion was created. A simple markup is generated that shows a location within the proposed text where changes were made. For the subsequent posts in a discussion, the content of the post is compared with content of the previous post and a simple markup is generated showing the location of the changes in the text. An example of a simple markup, shown on FIG. 13, uses a notation with color coded underlining, e.g. in embodiments (but not shown on FIG. 13) inserted text and modified text is underlined in a blue color 1102, 1103, while deleted text is underlined in red 1101.

Figure 14:
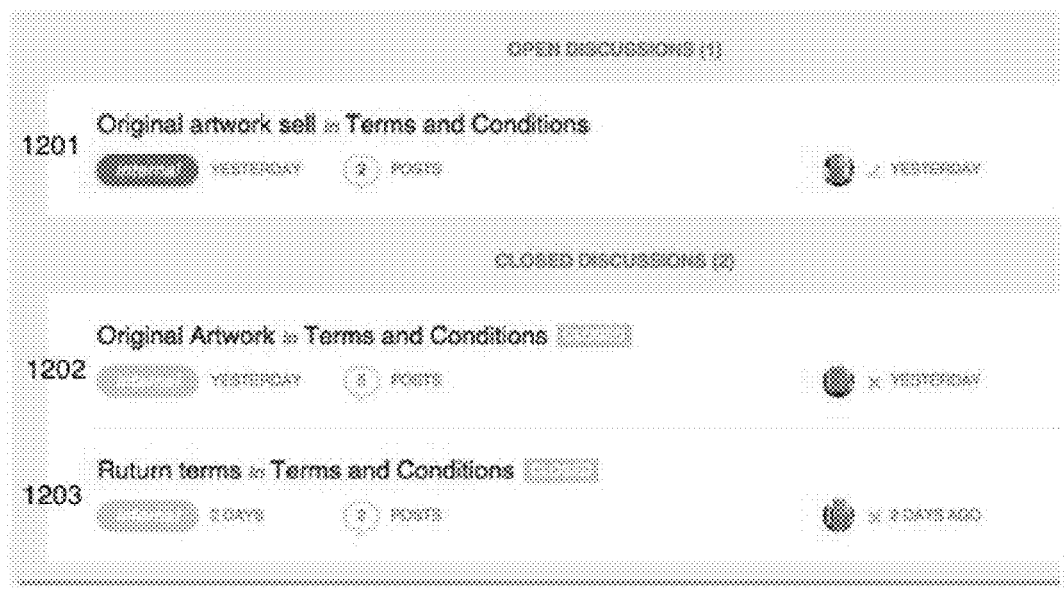
FIG. 14 shows a view showing all the discussions associated with a fragment of text according to the invention.

A view is then generated showing all of the discussions associated with a fragment of text (see FIG. 14). An open discussion section contains currently active discussions 1201 and closed discussions 1202 and 1203. The proposed text changes from the closed discussions have substituted associated text fragments in the document. Visibility is provided into how a text fragment has changed over the course of collaboration, including more than one discussion associated with a fragment of the text. An interactive view is generated that allows users to see a comparison of any proposed text in any of the discussions to any other version of the fragment, including the original version and any intermediate versions.

Figure 15:
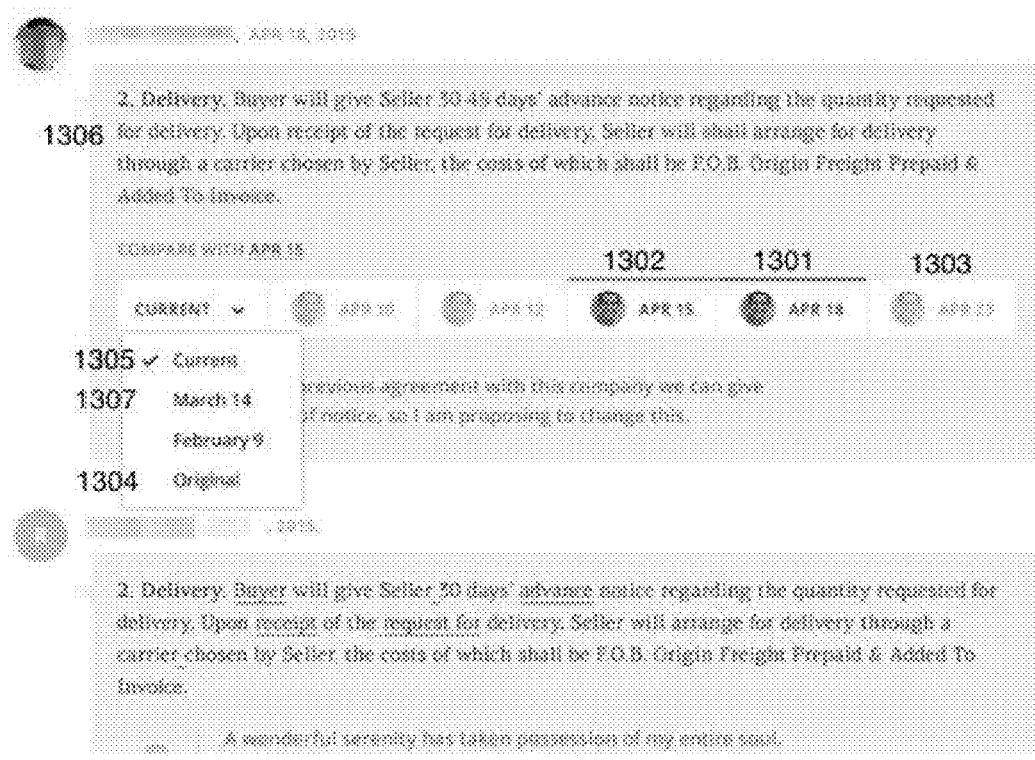
FIG. 15 shows an example of a discussion associated with a fragment of text that had at least three other discussions closed before according to the invention.

FIG. 15 shows an example of a discussion associated with a fragment of text that had at least three other discussions closed before. The comparison tools automatically generate at least one type of markup, such as a redline 1306, as a result of a comparison of the post in the discussion 1301 with any other posts in the discussion, such as text from the previous post 1302 or a next post 1303. The comparison can also be performed against the accepted version of the text fragment from the other discussions associated with the text fragment, such as a previously last closed discussion, e.g. a current version of the fragment in the document 1305, where the discussion closed on March 17 (1307) and the original version 1304.

Access to individual posts is controlled by collaborators when the posts are created. Users can determine who should be able to view a post. Some of the choices include:
  Author only—private posts;
  Specific people or predefined group of people;
  My team—members of internal team; an
  External—authorized members of the counter-party.

Figure 16:
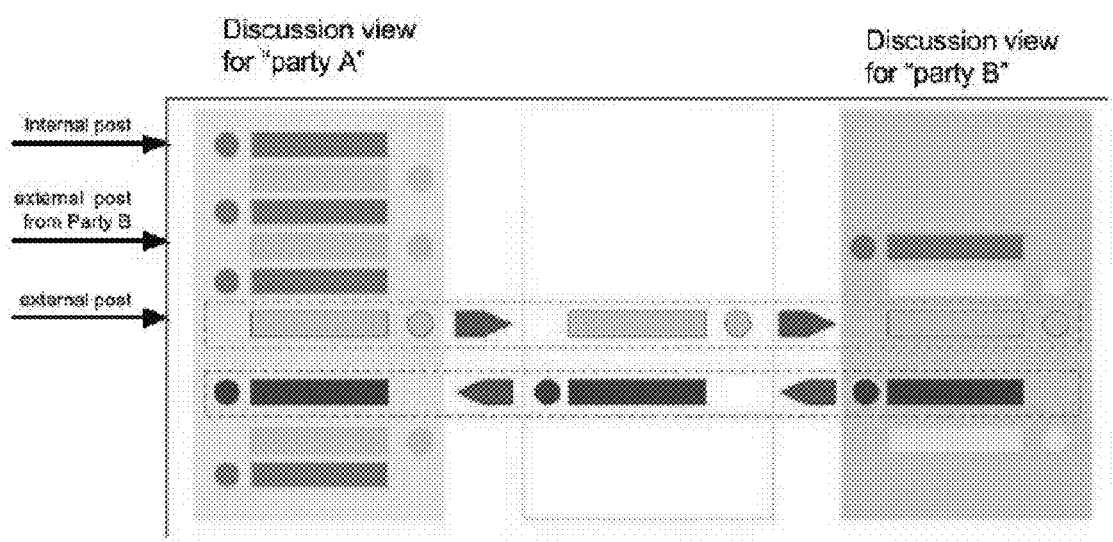
FIG. 16 depicts an example of the discussion involving more than one party.

FIG. 16 shows an example of a discussion involving more than one party. Additional controls are provided to enable collaboration with one or more external groups, such as counter-parties in contract negotiations. To initiate a cross-group collaboration, users are allowed to share documents with another group or request that the other group uploads the document. Upon obtaining the documents both parties can create discussions and start the collaboration over the documents in the document set.

Internal posts are intended for people that belong to a user' s group such as party A and cannot be seen by another party. Authorized collaborators in each group are also able to create external posts. External posts are see by authorized users from at least two groups.

Additionally, authorized users may choose to create at least one post in the context of at least one discussion with an option of making it visible to other participants including another group of collaborators in a later time. For example, during a contract negotiation one side may decide to create a proposal containing multiple changes and, instead of releasing them one-by-one, may decide to release them as a single package, so the opposing side gets one notification and can process the entire package. To do this, embodiments of the invention generate a special pending draft post that is added to a discussion and that does not become visible to users in other groups. Unlike a discussion containing internal posts only, a discussion with external posts can only be closed upon one side accepting a text proposed in an external post by another side.

Notifications

Various types of notifications are generated that can be delivered over email, mobile push notification, or Web push notifications in response to various types of activities in discussions. Some examples include a new post in a discussion that the user started; a new post in a discussion in which user participated; a new discussion started; a discussion is closed; and a discussion priority is changed.

When writing a comment in a post, an author is allowed to reference other users via the user mention mechanism. When a post with a user mention is submitted, a notification is generated and delivered to the referenced user that includes an actionable reference to the appropriate discussion and the post. Users are able to control notification behavior associated with a given discussion by subscribing and unsubscribing to specific events and by defining additional triggering rules.

Discussion Board

The discussion board (see FIG. 17) displays a list of discussions in an order relevant to a user. The order in which discussions appear on the discussion board is determined based on their relative relevance for a given user. The relevance is evaluated based on, for example, any of the following criteria:
  Discussions opened by a user with new posts;
  Discussions in which a user has been mentioned and has not posted anything yet indicated by marker 1502;
  New discussions that a user has not read yet, as indicated by marker 1504;
  Discussions that user participated in only with new posts;
  High priority discussions, as indicated by marker 1503;
  Discussions with new posts, as indicated by marker 1502;
  Long lasting discussions;
  Discussions with a large volume of posts; and
  Discussions with the most recent posts from another group waiting for a response.

Additionally, the list of discussions can be generated organized by, for example, the associated documents; status of the posts within a discussion, for example discussions containing active pending drafts can be shown in a separate section with an option of submitting at least one discussion from a list of pending drafts to another group; and origin of the most recent external posts, for example pending responses from a user's group vs. pending responses from the other groups.

A filtered discussion list can be generated based on various metadata and metrics associated with discussions by applying the filter 1501, or example discussions that user created; high priority discussions; most active discussions; new discussions; and discussions with new posts.

Import

The discussion information can be imported from variety of external systems and data formats. For example, a file produced by a word processing tool such as MS Word is obtained and discussions are automatically generated based on the results of a document comparison in view of the currently known content of the documents in the file. The changes can be identified as redlines by MS Word using the track changes feature or, based on the rich text comparison algorithms, an email can be obtained containing at least one of proposed changes and comments in one of the supported data formats. From this, a discussion or a post within an existing discussion can be automatically generated.

Formatting

Before a document from a document set is exported out or sent for an e-Signature, the formatting module enables interactive document formatting to apply correct styles, correct section numbering etc. All of the changes made during the formatting are captured in the format log report (see FIG. 18) that includes preview and compare functionality, such that each change can be analyzed and flagged in case of unexpected changes beyond style, numbering, etc.

Export

The export module generates documents in popular formats that can be downloaded on the user desktop's file system, propagated to a third party document repository or e-signature providers, etc. During the export, the document is reassembled based on the original document by applying all fragments from the accepted discussions. Headers, footers, and watermarks are also added that have either been imported along with the original document or that were added or authored. Additionally, a footer is added containing generated metadata, such as version number, timestamp, etc.

Analytics

Various metrics are automatically collected and generated for each group involved in a discussion., As users interact with the system, it automatically records activities by generating and storing internal representation of events in a structured data store, such as a relational database. The events can easily be queried and aggregated using SQL or another language commonly used for querying structured data. For example a number of posts submitted by each group; aggregated time between receiving an external post from another group and sending a response; and determining what group has to respond next based on what group created the most recent external post last.

Process bottlenecks are identified, such as discussions, people, and groups of people involved in a document collaboration. For example, discussions are identified that were open for extended period of time, had many posts including back and forth across multiple groups of collaborators, and/or that prevent documents and sets of documents from advancing to another stage in their lifecycle People and groups of collaborators are also identified that failed to reply or where their reply was delayed. A contract audit log captures events that occur during the contract lifecycle in a form suited for audit and compliance reporting. Some examples of events include the following:

1. Contract created
2. Contract canceled
3. Contract Chief Negotiator assigned
4. Contract approver assigned
5. Contract approver disabled
6. Contract approval started
7. Contract approver approves contract
8. Document Uploaded
9. Document Renamed 10. Document Deleted
11. User assigned to a document
12. User role on a document changed
13. User assignment on a document disabled
14. Discussion started
15. User mentioned
16. Discussion closed
17. Document updated
18. Document Formatting Started
19. Document Formatted
20. Document Approval started
21. Document Approved
22. Document downloaded Hybrid Model The system can generate a document in any one or more formats for word processing, such as MS Word doc/docx, Apple Pages, etc. or .pdf, based on any of text in the fragments of the original document, final text in the closed discussion, pending changes in the document, and posts of the active discussions.

The generated file incorporates all of the accepted changes as well as pending changes with appropriate markup denoting, for example, pending changes, comments, other metadata such as timestamps, etc.

Once an updated document is received from either party or stakeholder, the system ingests a document or a collection of documents in any of the popular format for word processing, such as MS Word doc/docx, Apple Pages, etc. The ingested document is automatically compared with the last known version of the document, and pending changes captured in the active discussions. Based on the results of the comparison, the system automatically generates one or more new discussions or new posts in existing discussions. During document ingestion, new discussions are automatically created, for example, whenever a change has been made or proposed including text or formatting, new comment has been created, pending change (revision) has been accepted, a pending change (revision) has been rejected, new fragment has been inserted, and a fragment has been deleted (see FIG. 19).

The changes are identified and system automatically generates new discussion or new posts to be created. New discussions are created when the modified fragment does not currently have an open discussion. Otherwise, the system creates a new post in an existing discussion. a newly created discussion is automatically named based on the combination of Natural Language Processing methods, such as concept tagging, as well as proprietary methods based on the analysis of the proposed change.

Figure 21:
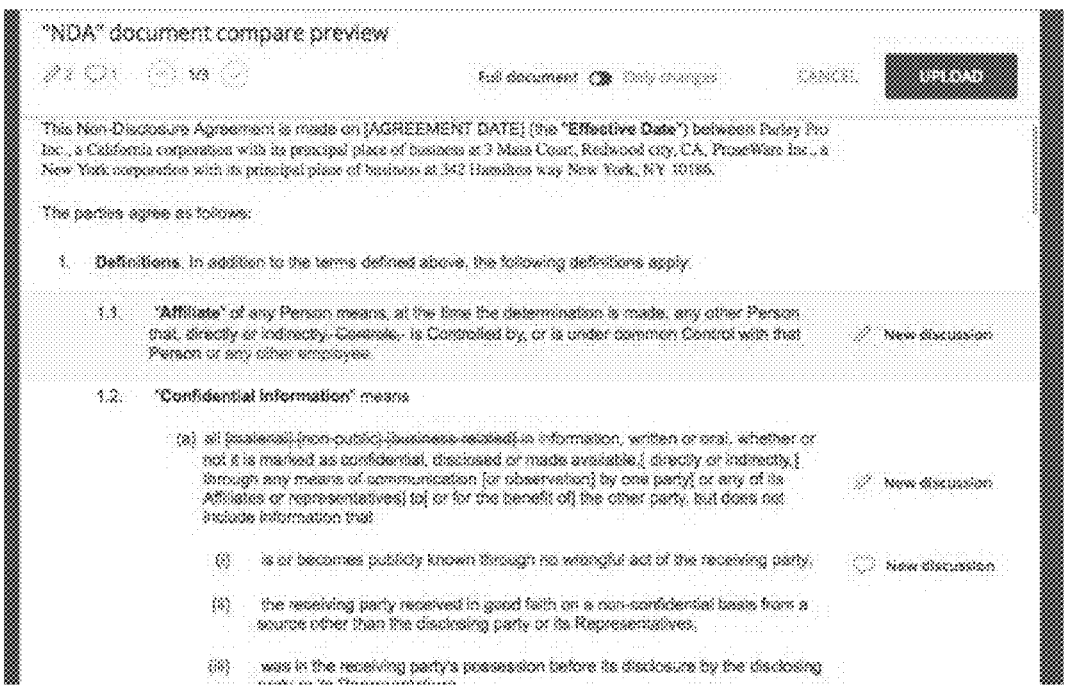
Figure 22:
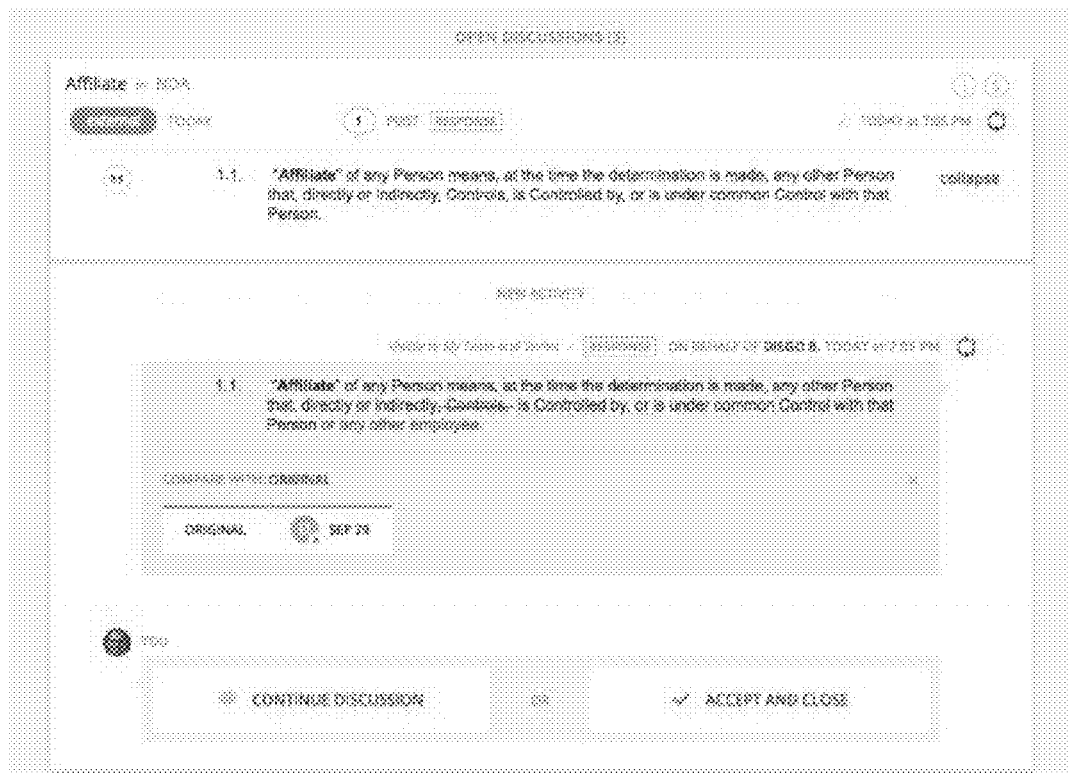
Figure 23:
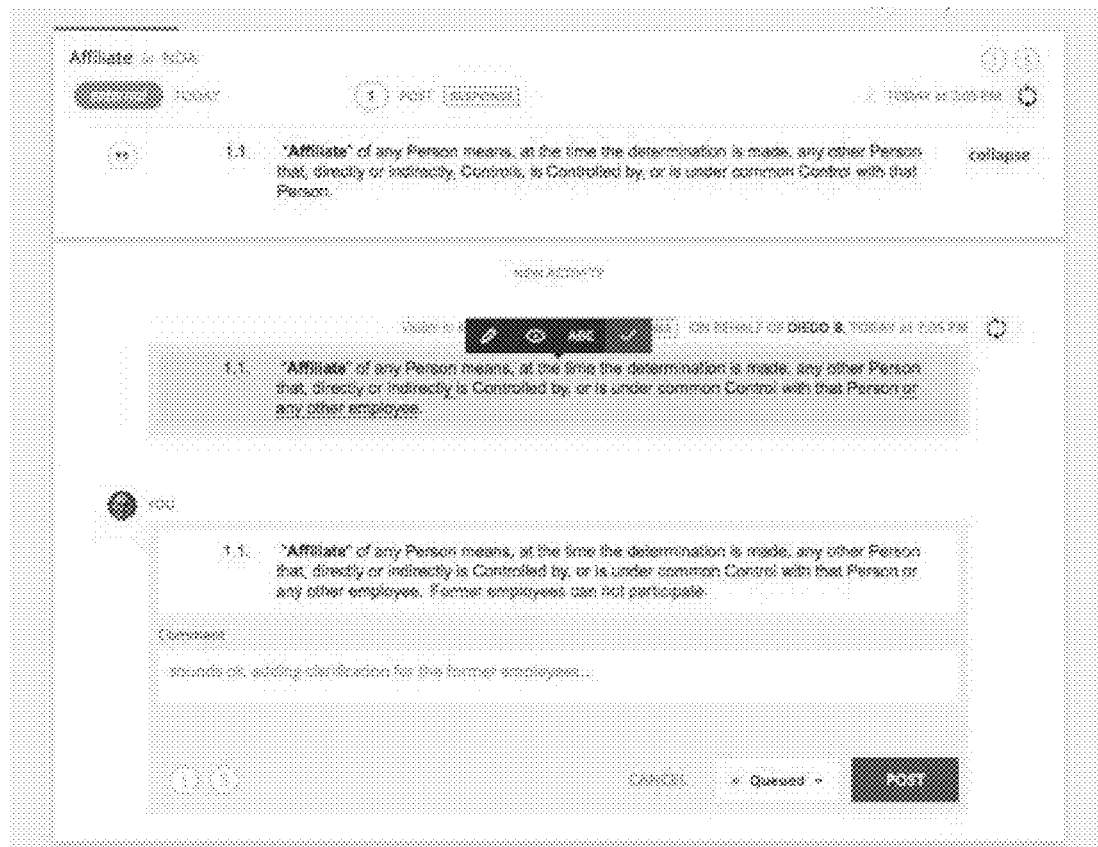

A preview of the results of the automatic analysis is generated and presented as either changes only (see FIG. 20) or as an entire document with the ability to navigate between the fragments with newly created discussions (see FIG. 21). See, also, FIGS. 22 and 23.

Figure 24:
Figure 25:
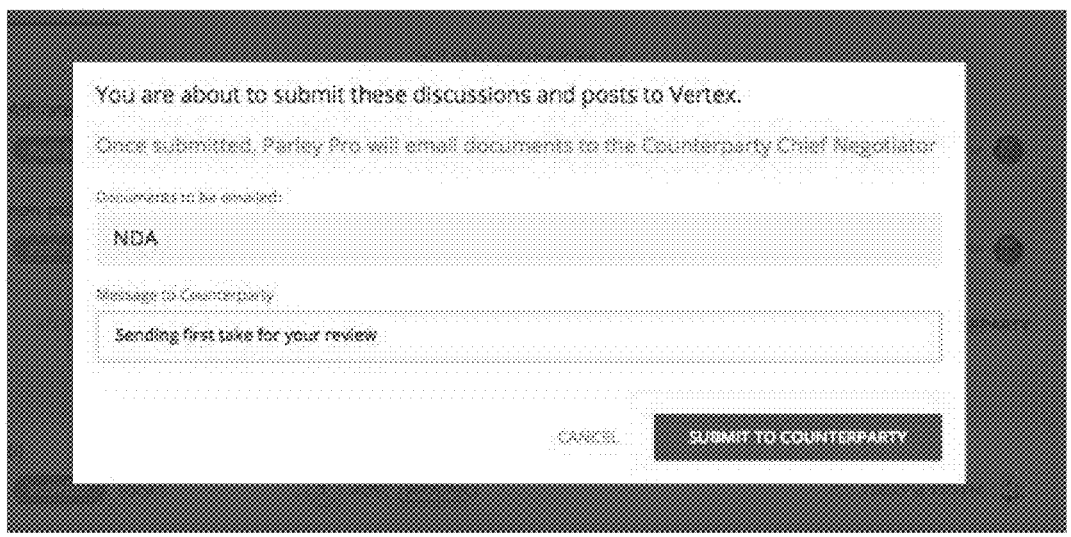
Figure 26:

The user can queue up several discussions/posts and submit them to a counterparty (see FIG. 24). Upon submission to the counterparty (see FIG. 25), the system assembles a new document using a combination of the fragments of text from the original document if they are unchanged via discussions, the most recent text from posts in discussions associated with a given fragment, the final text from accepted/closed discussions, and the most recent comments from pending discussions (see FIG. 26).

Computer Implementation

FIG. 27 is a block diagram of a computer system that may be used to implement certain features of some of the embodiments of the invention. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions, sequential or otherwise, that specify actions to be taken by that machine.

The computing system 40 may include one or more central processing units ("processors") 45, memory 41, input/output devices 44, e.g. keyboard and pointing devices, touch devices, display devices, storage devices 42, e.g. disk drives, and network adapters 43, e.g. network interfaces, that are connected to an interconnect 46.

In FIG. 27, the interconnect is illustrated as an abstraction that represents any one or more separate physical buses, point-to-point connections, or both connected by appropriate bridges, adapters, or controllers. The interconnect, therefore, may include, for example a system bus, a peripheral component interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also referred to as Firewire.

The memory 41 and storage devices 42 are computer-readable storage media that may store instructions that implement at least portions of the various embodiments of the invention. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 41 can be implemented as software and/or firmware to program one or more processors to carry out the actions described above. In some embodiments of the invention, such software or firmware may be initially provided to the processing system 40 by downloading it from a remote system through the computing system, e.g. via the network adapter 43.

The various embodiments of the invention introduced herein can be implemented by, for example, programmable circuitry, e.g. one or more microprocessors, programmed with software and/or firmware, entirely in special-purpose hardwired, i.e. non-programmable, circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for document collaboration, comprising:
  a processor obtaining a set of documents as an input;
  said processor splitting said set of documents into a series of fragments by splitting the documents into fragments, parsing out headers, footers, watermarks, and other types of formatting data and metadata and storing that information for future use, wherein the fragments comprise any of paragraphs, sections and sub-sections of the documents, and user defined fragments of variable length;

said processor securely storing said series of fragments in encrypted form using tenant specific encryption keys in a combination of a relational database and an unstructured content store;

said processor recognizing a reference pattern and generating a view and internal data model to establish reference relationships between the fragments;

said processor granting access to individual fragments within the series of fragments to a plurality of users;

said processor providing a controlled workflow-driven mechanism for discussion-centered collaboration between users;

said processor obtaining proposed changes and comments from said users as structured discussions that are associated with the fragments from the document set; and said processor restricting changes to the documents from the document set to changes to the fragments from the document set that are approved in associated discussions only;

wherein, subject to approval, said users are allowed to create, edit, manage, collaborate, and communicate over said set of documents.

2. The method of claim 1, further comprising:
said processor providing a discussion-centered collaboration between users pursuant to a multi-party contract negotiation and/or a large scale collaboration.

3. The method of claim 1, further comprising:
said processor generating documents in one or more word processing or other formats based on any of text in the fragments of an original document, final text in a closed discussion, pending changes in a document, and posts of active discussions;

wherein a generated document incorporates all accepted changes, as well as pending changes with appropriate markup denoting any of pending changes, comments, and other metadata.

4. The method of claim 1, further comprising said processor with regard to said documents:
creating a discussion, creating a post, closing a discussion, and managing a discussions and posts lifecycle within one or more discussions;
controlling a lifecycle of fundamental business objects, fundamental business objects comprising any of discussions, documents, sets of documents, said workflow module orchestrating user notifications and state transitions;
orchestrating interactions between collaborators, moderators, and other participants over discussions, documents, and sets of documents;
delivering notifications to collaborators;
managing tenants and users within a specific discussion;
reporting on key business events; and
managing authentication and authorization.

5. A document collaboration apparatus, comprising a processor and a memory having instructions stored therein which, when executed by the processor, implement a document service comprising:
a document import module for obtaining a document set through any of a plurality of channels;
a document model comprising an internal representation of the document set based on document fragments that are generated by splitting the documents into fragments, parsing out headers, footers, watermarks, and other types of formatting data and metadata and storing that information for future use, wherein the fragments comprise any of paragraphs, sections and sub-sections of the documents, and user defined fragments of variable length during the document set import;
said document model recognizing a reference pattern and generating a view and internal data model to establish reference relationships between the fragments;
a fragment versioning module for managing evolution of the document fragments throughout a document set lifecycle;
a document preview module interfacing with a discussion service for generating a preview of the document set by assembling versions of the fragments from discussions and from the original documents;
a document export module for generating documents in one or more word processing formats by assembling versions of the fragments from accepted discussions and fragments from the original document set; and
a formatting module for providing document formatting capabilities to authorized users to prepare the document for export, and for generating a detailed audit trail for any formatting changes; and
a combination of a relational database and an unstructured content store for securely storing said document fragments in encrypted form using tenant specific encryption keys.

6. The document collaboration apparatus of claim 5, further comprising:
a discussions service comprising:
a discussion and posts module for any of creating a discussion, creating a post, closing a discussion, and managing a discussions and posts lifecycle within one or more discussions;
a workflow module for controlling a lifecycle of fundamental business objects, said fundamental business objects comprising any of discussions, documents, sets of documents, said workflow module orchestrating user notifications and state transitions;
a collaboration module for orchestrating interactions between collaborators, moderators, and other participants over discussions, documents, and sets of documents;
a notification gateway for delivering notifications to collaborators;
a tenant and user module for managing tenants and users within a specific discussion;
an audit trail module for reporting on key business events; and
a security module for managing authentication and authorization.

7. The document collaboration apparatus of claim 6, said security module further comprising:
a role-based model with optional multi-factor authentication, advanced encryption, DDOS protection, and other enterprise level security features.

8. The document collaboration apparatus of claim 5, said notification gateway further comprising any of:
an email module for providing email-based notification delivery;
an SMS module for delivering SMS-based notifications; and
a mobile push module for delivering push notifications.

9. The document collaboration apparatus of claim 5, wherein said document import module obtains documents through any of:

a Web upload to allow users upload the documents from a file system mounted on a desktop in a secure way;

a third party document and file repository by using the third party repository gateway; and a mobile device using a native application by using native client library.

10. The document collaboration apparatus of claim 5, wherein said document export module generates documents in any of a word processor, Open Office, or Portable Document Format (PDF) format.

11. The document collaboration apparatus of claim 6, wherein discussions and posts are created by any of:

a Web application;

a native mobile application; and a discussion import module.

12. The document collaboration apparatus of claim 5, further comprising:

said document export module generating documents in one or more word processing or other formats based on any of text in the fragments of an original document, final text in a closed discussion, pending changes in a document, and posts of active discussions; wherein a generated document incorporates all accepted changes, as well as pending changes with appropriate markup denoting any of pending changes, comments, and other metadata.

13. The document collaboration apparatus of claim 12, further comprising:

said document import module, once an updated document is received from either party or stakeholder, ingesting said document in one or more word processing or other formats;

said document service automatically comparing said ingested document is with a last known version of the document; and said document service capturing pending changes in active discussions and, based on the results of the comparison, said document service automatically generating one or more new discussions or new posts in existing discussions.

14. The document collaboration apparatus of claim 13, further comprising:

said document service, during document ingestion, automatically creating new discussions whenever any of a change is made or proposed including text or formatting a new comment is created, a pending change is accepted, a pending change is rejected, a new fragment is inserted, and a fragment is deleted.

15. The document collaboration apparatus of claim 14, further comprising:

said document service automatically identifying changes and automatically generating a new discussion or new posts;

wherein new discussions are created when a modified fragment does not currently have an open discussion, otherwise, a new post is created in an existing discussion.

16. The document collaboration apparatus of claim 15, further comprising:

said document service generating and presenting a preview of the results of said automatic analysis as any of changes only and as an entire document with the ability to navigate between the fragments with newly created discussions.

17. The document collaboration apparatus of claim 16, further comprising:

wherein a plurality of discussions/posts are queue-able and submit-able to a counterparty;

upon submission to said counterparty, said document service assembling a new document using a combination of the fragments of text from the original document if they are unchanged via discussions, most recent text from posts in discussions associated with a given fragment, final text from accepted/closed discussions, and most recent comments from pending discussions.

18. A document set collaboration method, comprising:

uploading a document set by any of direct upload, connection to a third party document repository system, referencing a document, from a set of documents that has previously been obtained, or from another party involved in a collaboration;

generating a preliminary document outline and cross references;

creating uniquely identifiable portions of said documents by splitting the documents into fragments, parsing out headers, footers, watermarks, and other types of formatting data and metadata and storing that information for future use, wherein the fragments comprise any of paragraphs, sections and sub-sections of the documents, and user defined fragments of variable length;

securely storing said fragments in encrypted form using tenant specific encryption keys in a combination of a relational database and an unstructured content store;

recognizing and establishing a reference pattern across multiple documents in the document set; and generating a view and internal data model that establishes reference relationships between the fragments of the text across the document sets;

granting access to individual fragments within the series of fragments to a plurality of users;

providing a controlled workflow-driven mechanism for discussion-centered collaboration between users;

obtaining proposed changes and comments from said users as structured discussions that are associated with the fragments from the document set; and restricting changes to the documents from the document set to changes to the fragments from the document set that are approved in associated discussions only;

wherein, subject to approval, said users are allowed to create, edit, manage, collaborate, and communicate over said set of documents.

19. The method of claim 18, further comprising:

using a document outline and references that are defined in a word processing file before the document set is uploaded, when available; and otherwise, using a natural language pattern matching algorithm to identify potential section headings and references.

20. The method of claim 18, further comprising:

presenting a user with a user interface showing machine identified sections and an overall document outline with an option for the user to confirm same.

21. The method of claim 18, further comprising:

training to use more or other words by the pattern recognition algorithm to identify potential references.

22. The method of claim 18, further comprising:

assigning users to documents and portions of documents, the users having specific roles.

23. The method of claim 18, further comprising:

creating discussions associated with specific portions of the document set based upon user inputs.

24. The method of claim 23, further comprising:
generating a discussion board based upon a user specific ranking.

25. The method of claim 23, further comprising:
capturing user input in respective discussions; and
propagating user notifications accordingly.

26. The method of claim 23, further comprising:
allowing authorized users to grant access to internal collaborators to entire documents or a portion of a document from the document set.

27. The method of claim 26, further comprising:
when a user is granted access to at least one document from a document set, generating a notification comprising an embedded link to at least one document in the document set.

28. The method of claim 23, further comprising:
upon accessing at least one document, allowing collaborators to start a new discussion by providing an initial input to a specific fragment.

29. The method of claim 23, further comprising:
closing a discussion and modifying portions of the documents affected by the discussion;
reassembling the document from most up-to-date portions thereof and formatting the header, footer, and watermark;
formatting the document;
creating an audit trail; and
producing a final version of the documents in the document set.

30. The method of claim 18, further comprising:
generating documents in one or more word processing or other formats based on any of text in the fragments of an original document, final text in a closed discussion, pending changes in a document, and posts of active discussions;
wherein a generated document incorporates all accepted changes, as well as pending changes with appropriate markup denoting any of pending changes, comments, and other metadata.

31. A document collaboration method, comprising:
obtaining a plurality of documents through any of a plurality of channels;
splitting said plurality of documents into a series of fragments by splitting the documents into fragments, parsing out headers, footers, watermarks, and other types of formatting data and metadata and storing that information for future use, wherein the fragments comprise any of paragraphs, sections and sub-sections of the documents, and user defined fragments of variable length;
securely storing said series of fragments in encrypted form using tenant specific encryption keys in a combination of a relational database and an unstructured content store;
creating a document model by recognizing a reference pattern and generating a view and internal data model comprising an internal representation of the documents based on document fragments that are generated during the document import;
managing evolution of the document fragments throughout a document lifecycle;
generating a preview of the documents by assembling versions of the fragments from discussions and from the original documents;
generating documents in one or more word processing formats by assembling versions of the fragments from accepted discussions and fragments from the original document; and
providing document formatting capabilities to authorized users to prepare the document for export, and for generating a detailed audit trail for any formatting changes.

32. The method of claim 31, further comprising:
creating a discussion, creating a post, closing a discussion, and managing a discussions and posts lifecycle within one or more discussions;
controlling a lifecycle of fundamental business objects, fundamental business objects comprising any of discussions, documents, sets of documents, a workflow module orchestrating user notifications and state transitions;
orchestrating interactions between collaborators, moderators, and other participants over discussions, documents, and sets of documents;
delivering notifications to collaborators;
managing tenants and users within a specific discussion;
reporting on key business events; and
managing authentication and authorization.

33. The method of claim 31, further comprising:
generating documents in one or more word processing or other formats based on any of text in the fragments of an original document, final text in a closed discussion, pending changes in a document, and posts of active discussions; wherein a generated document incorporates all accepted changes, as well as pending changes with appropriate markup denoting any of pending changes, comments, and other metadata.

* * * * *

UNITED STATES PATENT AND TRADEMARK OFFICE
CERTIFICATE OF CORRECTION

PATENT NO. : 10,511,653 B2
APPLICATION NO. : 15/291605
DATED : December 17, 2019
INVENTOR(S) : Roman Kisin and Lilian Caldeira It is certified that error appears in the above-identified patent and that said Letters Patent is hereby corrected as shown below:

On the Title Page

Please change the Assignee information to read:
PARLEY PRO INC., Los Altos, CA. (US)

Signed and Sealed this
Fourteenth Day of April, 2020

Andrei Iancu
*Director of the United States Patent and Trademark Office*